(12) United States Patent
Kaiser et al.

(10) Patent No.: US 6,431,110 B1
(45) Date of Patent: Aug. 13, 2002

(54) FOOD TEMPERATURE MEASURING DEVICE WITH AUDIBLE SIGNAL

(76) Inventors: Dolores Kaiser, 1219 Ashdy La., Hendersonville, NC (US) 28791; Frederick Kaiser, 131 Bethel Rd., Albertson Long Island, NY (US) 11590

( * ) Notice: Subject to any disclaimer, the term of this patent is extended or adjusted under 35 U.S.C. 154(b) by 0 days.

(21) Appl. No.: 09/677,712

(22) Filed: Sep. 30, 2000

(51) Int. Cl.⁷ .................................................. G01K 5/60
(52) U.S. Cl. ........................ 116/216; 116/221; 116/101
(58) Field of Search ................................. 116/101, 216, 116/221, 148, 152, 348, 154–62, 114.5, DIG. 10; 374/142, 155; 368/10, 21, 107, 82

(56) References Cited

U.S. PATENT DOCUMENTS

| | | | |
|---|---|---|---|
| 1,918,258 A | 7/1933 | Fredricksen | |
| 3,373,611 A | 3/1968 | Trott | |
| 3,778,798 A | 12/1973 | Heit | |
| 3,830,191 A | * 8/1974 | Burke | 116/67 R |
| 4,059,997 A | 11/1977 | Trott | |
| 4,083,250 A | 4/1978 | Goff et al. | |
| 4,089,222 A | * 5/1978 | Perkins | 116/101 |
| 4,354,448 A | * 10/1982 | Lin | 116/161 |
| 4,503,800 A | * 3/1985 | Schliep | 116/221 |
| 4,748,931 A | 6/1988 | Volk | |
| 4,950,085 A | * 8/1990 | Horvath | 116/221 |
| 5,312,188 A | 5/1994 | Ashe | |
| 5,487,352 A | 1/1996 | Williams et al. | |
| 5,666,331 A | * 9/1997 | Kollin | 368/245 |
| 6,065,391 A | 5/2000 | Archard et al. | |

* cited by examiner

Primary Examiner—Diego Gutlierrez
Assistant Examiner—Travis Reis
(74) Attorney, Agent, or Firm—McHale & Slavin

(57) ABSTRACT

The present invention is a temperature measuring device for insertion into food which audibly signals the user when the temperature of the food reaches a predetermined level. The stem of the device contains a temperature sensitive spring in bi-metallic communication. As the internal temperature of the substance increases, the temperature sensing material and spring slowly rise causing the disk to rotate back to its original position. When the original position is reached, the actuation pin on the temperature pointer activates a series of levers which release a manually pre-wound coil spring. The unwinding of the coil spring activates a large gear which then activates a small gear causing a clapper with a plurality of wings to spin in circles and repeatedly ring a bell. Thus, the user is audibly alerted when the internal temperature of the substance reaches the desired threshold level.

7 Claims, 9 Drawing Sheets

FOOD TEMPERATURE MEASURING DEVICE WITH AUDIBLE SIGNAL

FIELD OF THE INVENTION

This invention relates generally to a temperature measuring device for use in cooking food, and particularly to a temperature measuring device having an audible alarm to alert the user when the temperature of the food reaches a predetermined threshold level.

BACKGROUND OF THE INVENTION

Various food products must be cooked until the internal temperature of the food reaches a predetermined temperature. This is especially true with respect to meat due to health purposes and personal preference. By achieving a certain internal temperature, the preparer can be reasonably certain that the food contains no living organisms which are known to have an immediate effect in many consumers. Also, the preparer can serve a dish that conforms to the personal preference of the consumer, i.e. rare, medium, or well-done without the need of cutting open the food to check or attempt to rely soley on time cooked.

Conventional food measuring devices, generally referred to as "thermometers" incorporate a sensing probe for insertion into the food. Thus, if a thermometer only indicates temperature, the food preparer must diligently check the thermometer to determine when the food has reached the desired temperature.

A known cooking thermometer type device that provides an indicator, such as a pop up element or color change, indicated when a threshold temperature has been reached in accordance with a predetermined measurement. However, these devices are generally not adjustable or precisely accurate. Thus, the preparer must diligently check the indicator to determine when the indicator is activated.

Known prior art food visual thermometers include U.S. Pat. No. 4,059,997; U.S. Pat. No. 3,373,611; U.S. Pat. No. 5,312,188; U.S. Pat. No. 1,918,258; and Foreign Patent WO 90/11497.

U.S. Pat. No. 6,065,391 discloses an electronic chef's fork which displays the degree of doneness of food. However, it is not adjustable and gives no audible signal.

U.S. Pat. Nos. 5,487,352 and U.S. Pat. No. 4,748,931 disclose a pop-up temperature indicator. The devices have a meltable seal that melts at a set point causing a portion of the device to pop-up thus alerting the user that the food is done. Again, there is no audible signal.

U.S. Pat. No. 4,083,250 discloses a food thermometer with an audible device. on reaching a set point cooking temperature, a valve opens enabling steam in a reservoir to activate a whistle alarm. This device does provide an audible alarm but requires filling and projects a hot steam upon activation.

U.S. Pat. No. 3,778,798 discloses a food thermometer for producing an audible alarm but it is a sophisticated and complex unit generally only available as a permanent part of an oven.

Thus, conventional thermometer devices used for cooking require the preparer to carefully and diligently check the device to prevent the food from becoming overcooked. Should the food preparer become distracted with other dishes, a phone call, etc. and forget to check the thermometer, reliance on conventional cooking thermometer devices may result in the food becoming overcooked and possibly inedible. Thus, what is needed is a means for audibly alerting the food preparer when the internal temperature of the food being cooked reaches a predetermined temperature.

SUMMARY OF THE INVENTION

The present invention is a food temperature indicating device having an audible signal that alerts the user when the temperature of the food reaches a predetermined threshold. In general, the instant invention is a temperature measuring device having a stem insertable into a suitable substance and a body with an audible alarm mechanism. The stem has an elongated sensing probe, a temperature sensitive material, and a spring, The body has a temperature indicia plate, an audible alarm, and trigger mechanism to activate the alarm. An adjustable temperature actuator is coupled to the alarm mechanism which includes a pointer manually positionable over the temperature indicia plate. The actuator is a rotating disk in operative communication with the pointer. A disk lever is rotatably connected to the disk so that the disk can be manually preset to a desired temperature.

The user turns a disk lever of the body which rotates the actuator until the pointer is aligned with the desired temperature on the temperature indicia plate. The probe houses a spring made of temperature sensitive material in bi-metallic communication. As the temperature of the food increases, the temperature of the sensitive material of the spring rises. This causes the sensitive material to expand. thus, the spring expands in a rotating direction. One end of the spring is anchored to the stem of the probe, and the other end is attached to a rod. The rod is then attached to the temperature pointer thus, when the internal temperature of the meat changes, the temperature pointer rotates accordingly.

When the desired threshold temperature is reached, an actuation pin depending from the temperature pointer triggers the alarm mechanism. The actuation pin releases the a series of levers, a prime lever, interlink, and endlink. First, the actuation pin releases the prime lever from the interlink allowing the interlink to pivot which then releases the endlink from a ratchet and the manually pre-wound coil spring. As the coil spring unwinds it rotates the clapper assembly. The clapper assembly has a plurality of wings that repeatedly strike a bell causing it to ring. As a result, the user is audibly alerted when the desired threshold temperature has been reached. The alarm can be turned off by increasing the set temperature which also reengages the ratchet.

Thus, it is an objective of the instant invention to provide an audible alarm for alerting the user when the temperature of suitable substance reaches a predetermined threshold.

It is a further objective of the instant invention to provide a temperature measuring device with an audible alarm that does not require filling with water or an electrical connection for operation.

It is yet another objective of the instant invention to provide a temperature measuring device with an audible alarm that is adjustable and inexpensive.

It is a still further objective of the invention to provide a temperature measuring device with an audible alarm that is self-contained having no discharge.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DESCRIPTION OF THE INVENTION

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Figure 1:
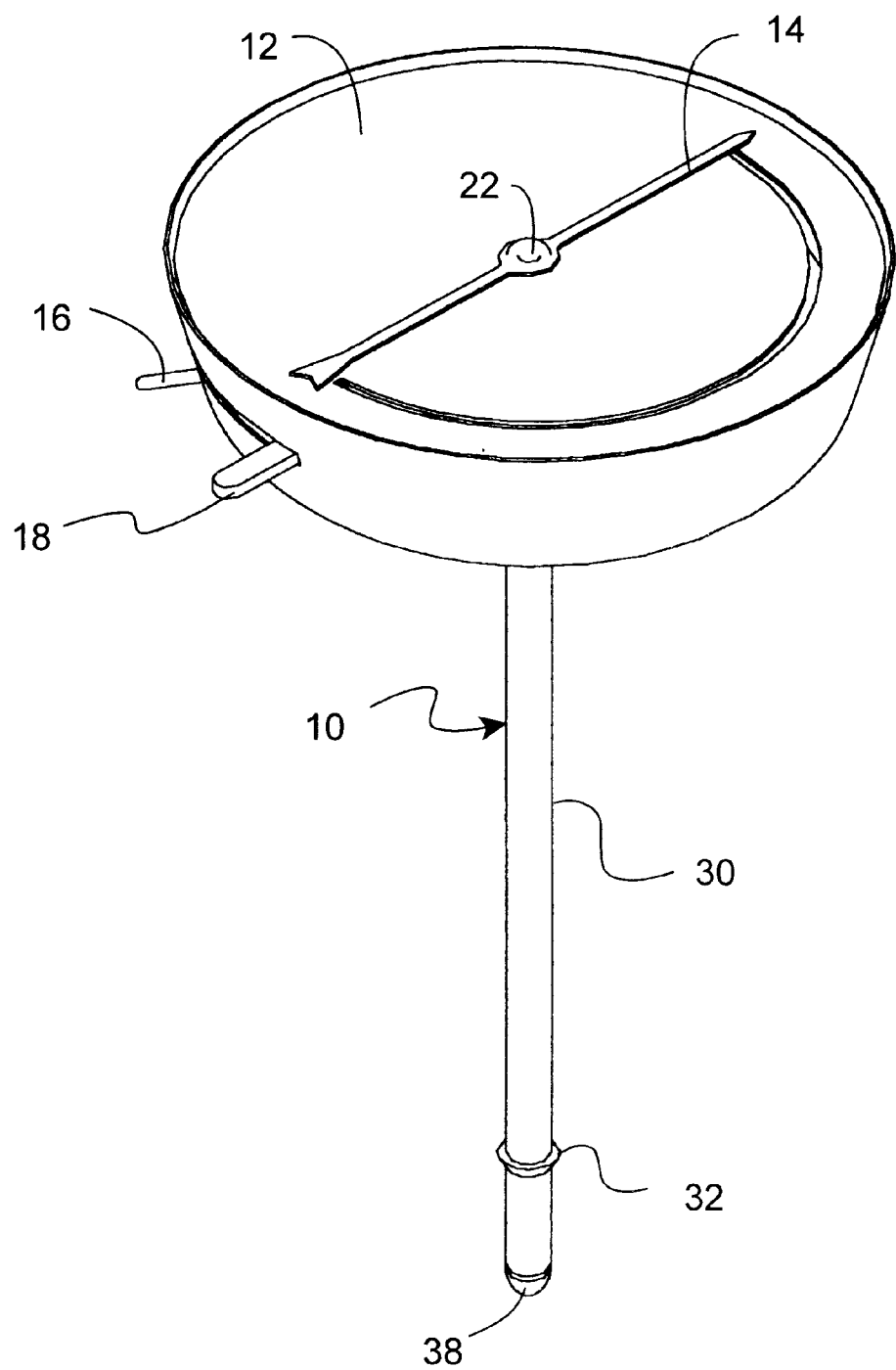
FIG. 1 is a pictorial view of the temperature measuring device with the optional hook.

Now referring to FIG. 1, shown is the temperature measuring device with a body 10 including a temperature indicia plate 12 and a temperature sensitive probe 30 having an insertion point 38 and an optional hook 32. The insertion point 38 of the temperature sensitive probe 30 is inserted into a suitable substance. The optional hook 32 will secure the inserted device into meats used in a rotisserie or the like. The temperature measuring device includes a temperature actuator 61 including temperature pointer 14, spring arm 16, disk lever 18, and a pointer cap 22. The disk lever 18 is slid until the temperature pointer 14 is aligned with the desired temperature on temperature indicia plate 12.

Figure 2:
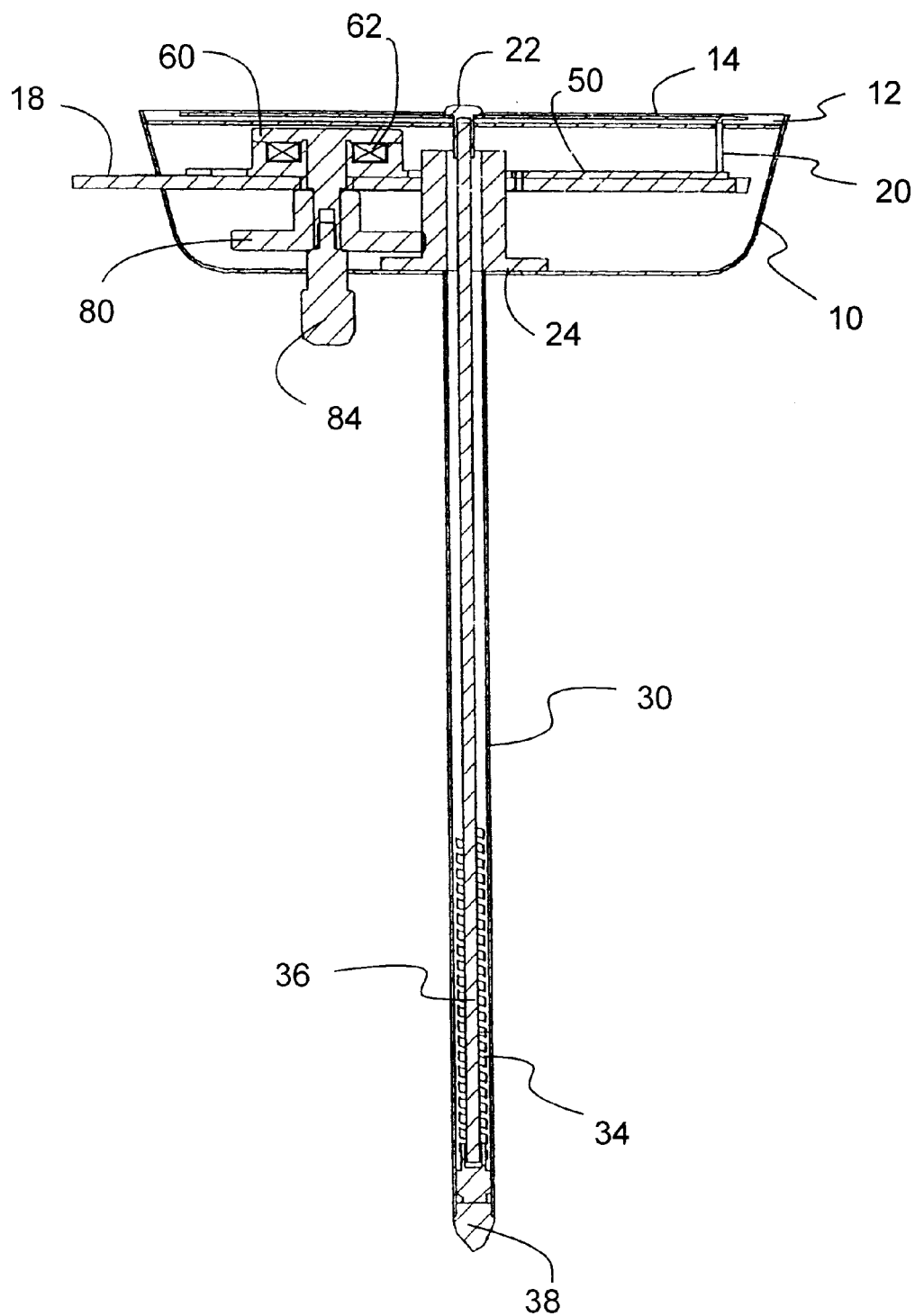
FIG. 2 is a cross sectional view of the temperature measuring device.
Figure 3:
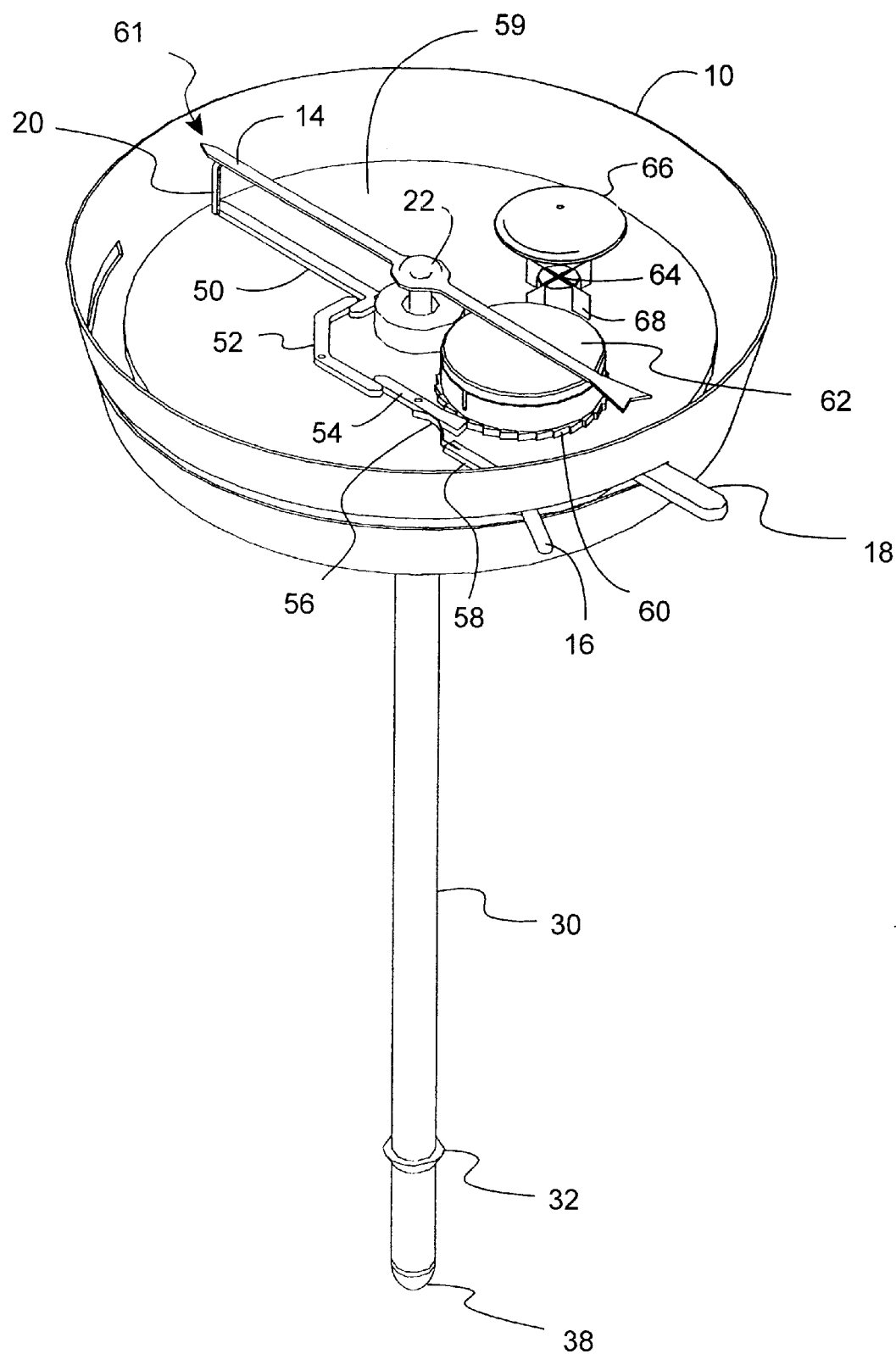
FIG. 3 is a diagrammatic view of the inside of the temperature measuring device.
Figure 4:
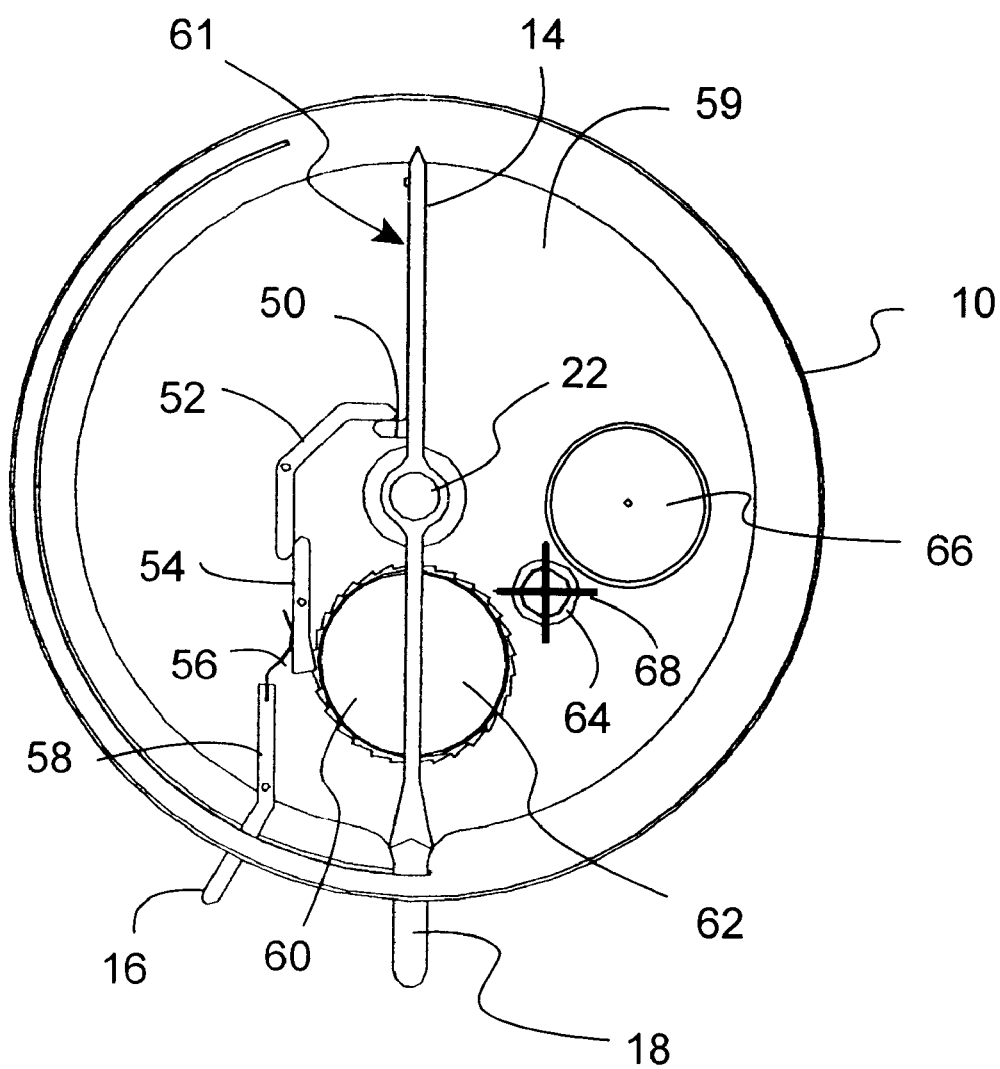
FIG. 4 is a top view of the inside of the temperature measuring device.
Figure 5:
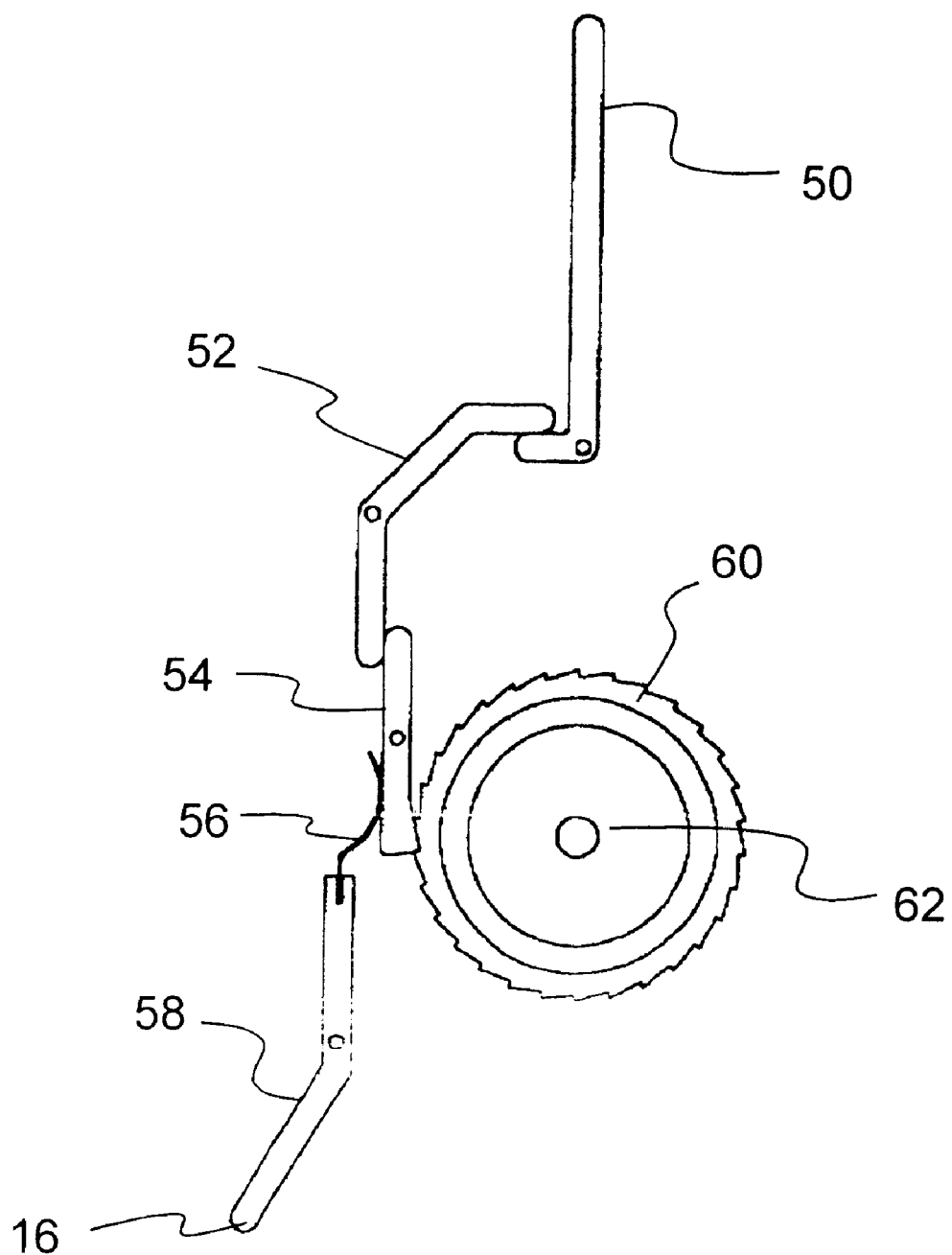
FIG. 5 is a close up view of the alarm mechanism of the temperature measuring device.
Figure 6:
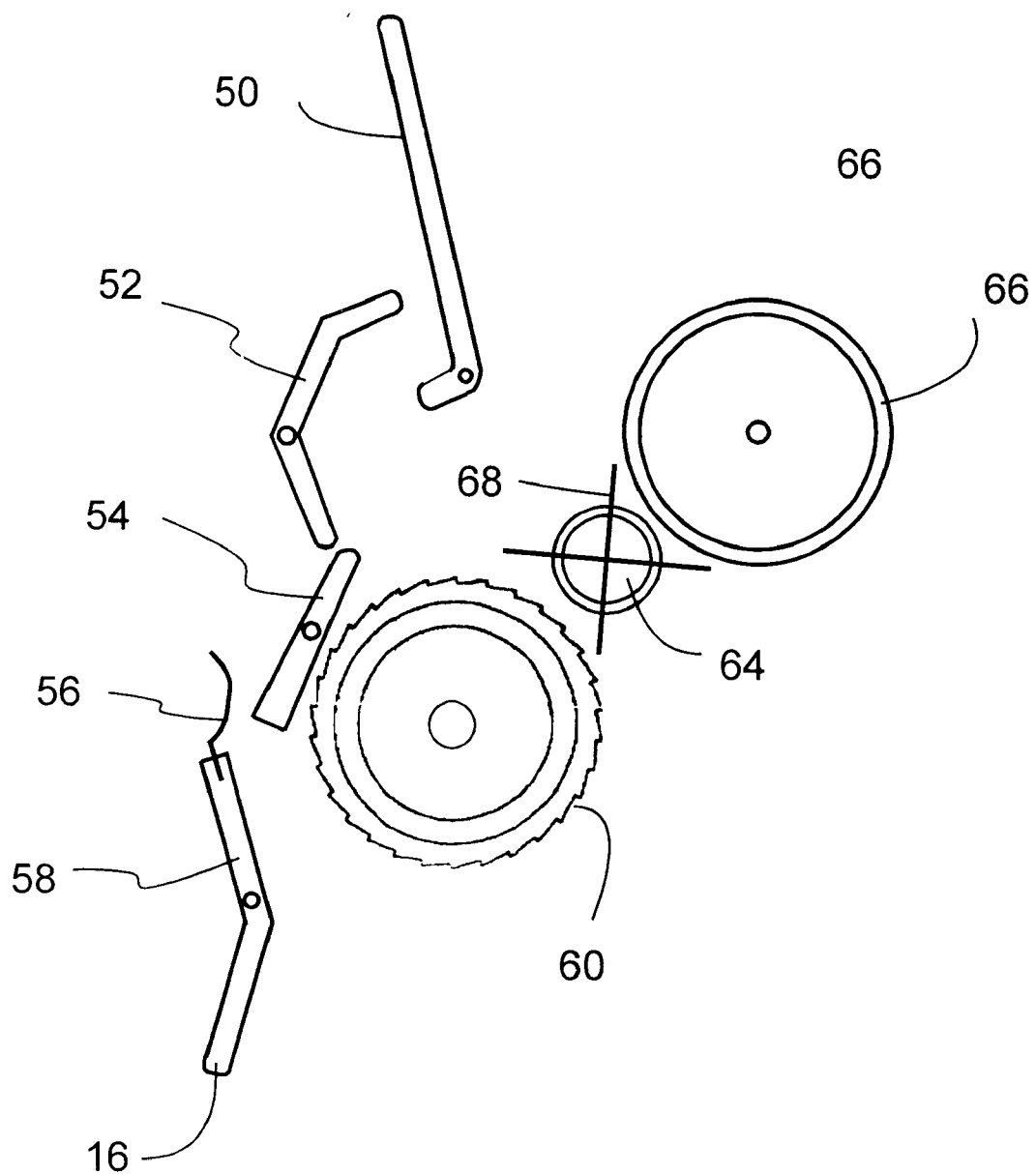
FIG. 6 is a close up view of the triggered alarm mechanism of the temperature measuring device.

Now referring to FIG. 2, shown is a cross sectional view of the temperature measuring device. The body 10 has a pointer cap 22 held in operative communication with the stem 30 by a center post 24. The stem 30 has a temperature sensitive bi-metallic spring 34, a connection rod 36, and an insertion point 38. The disk lever 18 is slid until the temperature pointer 14 is preset to the desired temperature. The temperature sensitive spring 34 is in bi-metallic communication. As the temperature of a suitable substance increases, the temperature sensitive spring 34, and connection rod 36 slowly rotate causing the pointer cap 22 of the temperature pointer 14 to slowly rotate toward the set point.

Now referring to FIGS. 3, 4, 5, and 6, shown is the alarm mechanism and temperature actuator 61 in the body 10. The temperature actuator 61 includes rotating disk 59 which is in operative communication with the pointer 14. The alarm mechanism comprises a prime lever 50, interlink 52, endlink 54, keep spring 56, keep 58, ratchet 60, coil spring 62, clapper 64, and a bell 66, all of which are affixed to a rotating disk 59. The rotating disk 59 is connected to disk lever 18 such that the disk can be manually preset to a desired temperature. The temperature pointer 14 has a downwardly depending actuation pin 20 at one end which engages with prime lever 20.

After the user manually winds the coil spring 62 and sets the temperature pointer 14 to the desired temperature, the thermometer spring 34 slowly rotates as the internal temperature of the substance increases. This causes the temperature pointer 14 to slowly rotate toward the set point, when it returns the set position, the actuation pin 20 attached to the end of the temperature pointer 14 triggers the alarm mechanism.

The actuation pin 20 releases the prime lever 50 causing the interlink 52 to pivot which then releases the endlink 54 from the ratchet 60 and the coil spring 62. As the coil spring 62 unwinds, it causes the clapper 64 to continually spin in circles. The clapper 64 has a plurality of wings 68 which repeatedly strike the bell 66 causing it to ring. The bell may first be tested by sliding the spring arm 16 of the keep 58. The attached keep spring 56 then releases the ratchet 60 and the coil spring 62 from the endlink 54. As described above, the bell will be rung. The keep 58 is slid back into its normal position to stop the ringing.

Figure 7:
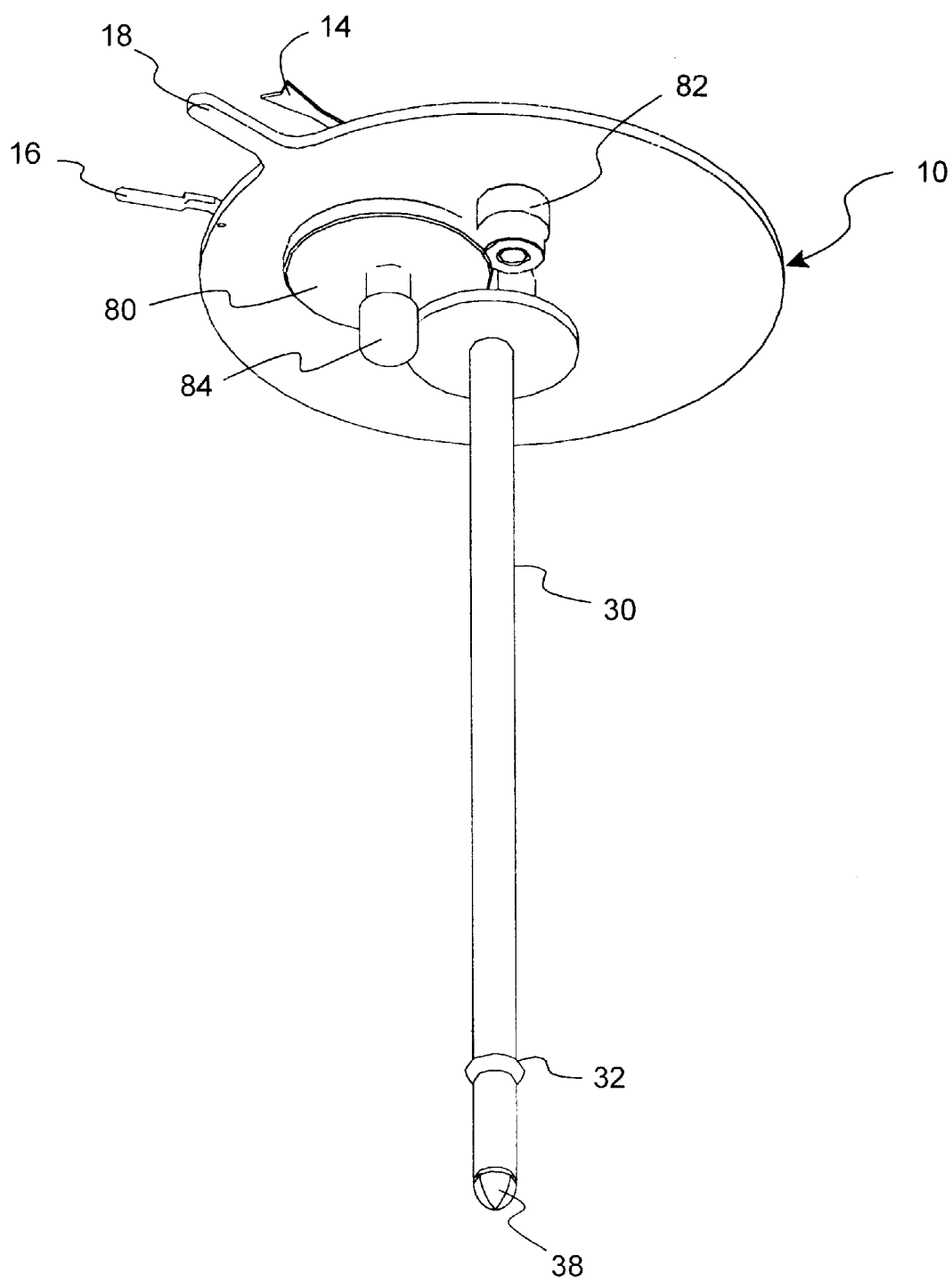
FIG. 7 is a bottom view of the temperature measuring device.
Figure 8:
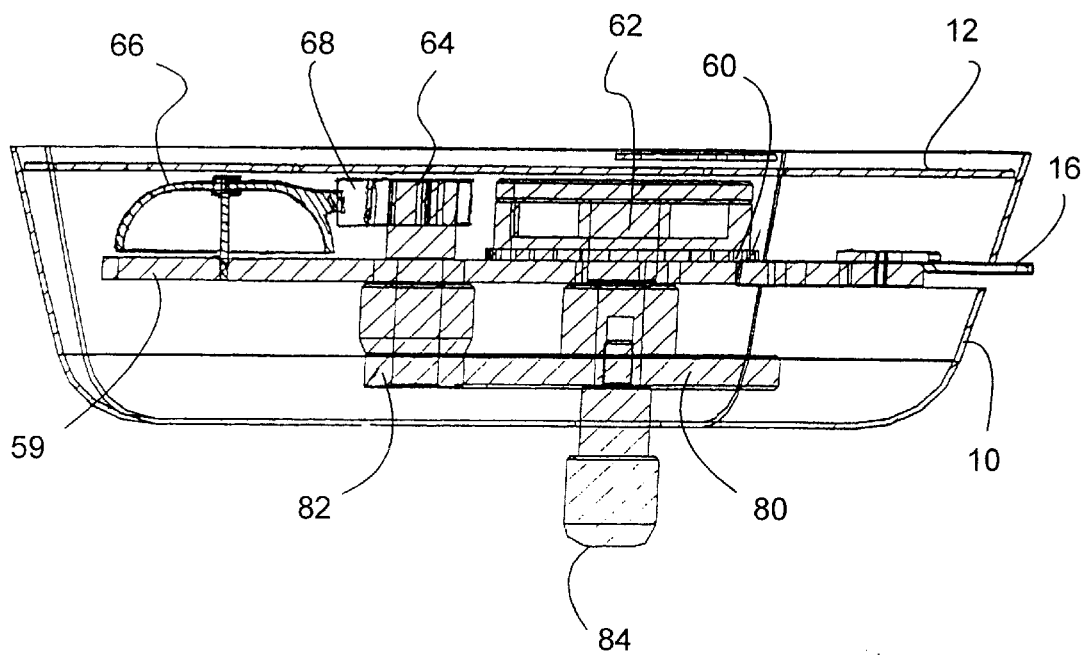
FIG. 8 is a centerline view of the temperature measuring device.

Now referring to FIG. 7, shown is a bottom view of the body comprising a large gear 80, small gear 82, and a key 84. Now referring to FIG. 8, shown is a centerline of the body. The key 84 is manually wound by the user before inserting the temperature sensitive probe 30 into a suitable substance. The wound key tightens the coil spring 62. After the alarm mechanism has been triggered, the endlink 54 releases the ratchet 60 and the coil spring 62. The released coil spring 62, causes the large gear 80 to turn the small gear 82 causing the clapper 64 to spin around in circles. The clapper wings 68 will continually strike the bell sending an audible signal to the user that the food has reached the desired threshold temperature.

Figure 9:
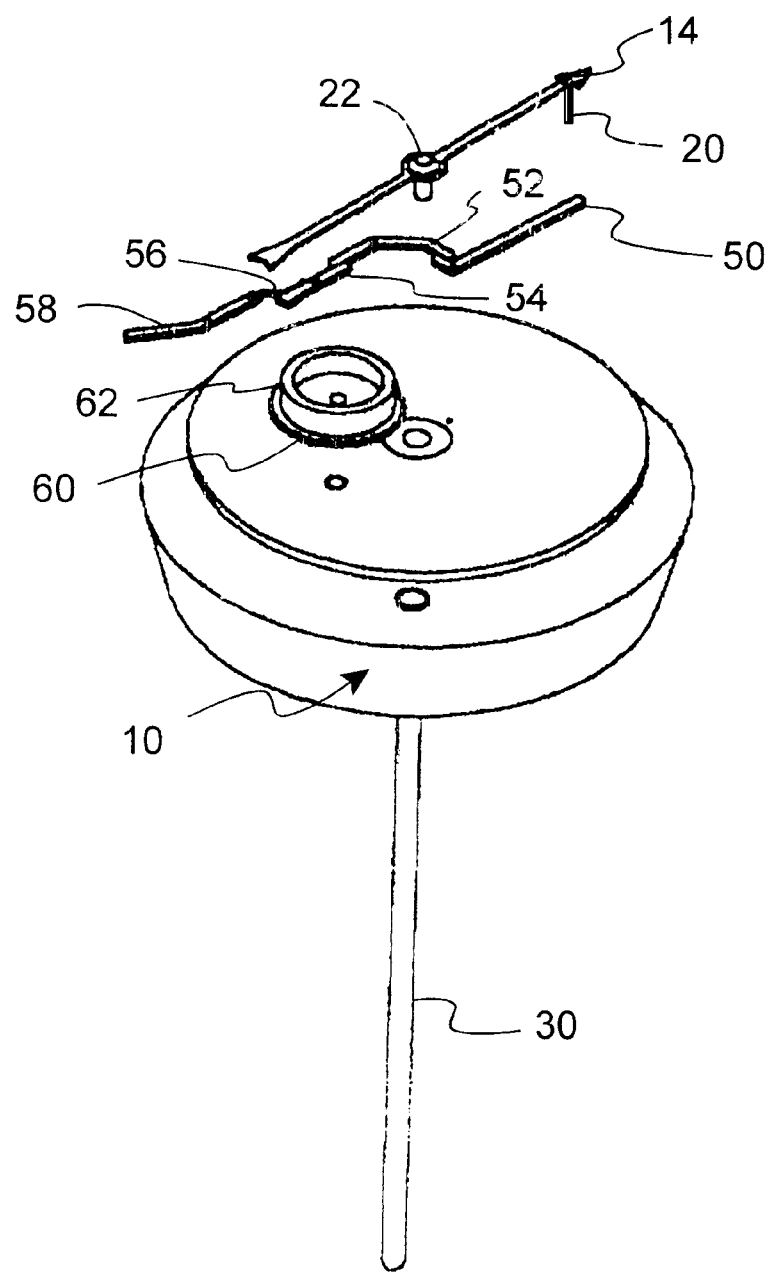
FIG. 9 is an exploded view of the temperature measuring device.

Now referring to FIG. 9, shown is an exploded view detailing the assembly of the thermometer body. By the above description there is disclosed a temperature measuring means able to be adjustably preset by the user to an operating temperature which when attained will produce an audible alarm signifying the fact to the user.

It is to be understood that while I have illustrated and described certain forms of my invention, it is not to be limited to the specific forms or arrangements of parts herein described and shown. It will be apparent to those skilled in the art that various changes may be made without departing from the scope of the invention and the invention is not to be considered limited to what is shown in the drawings and described in the specification.

What is claimed is:

1. An audible temperature measuring device for food, comprising;

a base having a top surface and a bottom surface, said top surface defining a cup shaped housing, said bottom surface having a temperature sensitive probe formed integral thereto and extending outwardly therefrom;

a temperature sensitive spring disposed in said temperature sensitive probe, said temperature sensitive spring coupled to an alarm mechanism operable to sound an audible alarm, said alarm mechanism including a ratchet releasably held by cooperating levers, a key capable of being manually wound, a coil spring tightened when said key is wound, a clapper with a plurality of wings, and a bell impacted by said clapper; and an adjustable temperature actuator coupled to said alarm mechanism, wherein said actuator includes a rotating disk in coupled to a pointer, said pointer having an actuation pin at one end, and a lever rotatably connected to said disk such that said disk can be manually preset to a desired temperature indicated by said pointer manually positionable over a temperature indicia plate, said actuator adjusted by a lever extending outward from said base;

wherein said cooperating levers of said alarm mechanism include a prime lever being L-shaped, the long end of said L-shaped prime lever engaging said actuation pin, an interlink having a first and second end, the short end of said L-shape of said prime lever engaging said first end of said interlink, and an endlink having a first and second end, said first end of said endlink engaging said second end of said interlink, said second end of said endlink releasably held by said ratchet;

wherein a desired temperature is selected by moving said pointer over a temperature range and said probe inserted into a food substance whereby said audible alarm is activated upon the elevation of said food substance to a temperature approximate the desired temperature.

2. The device of claim 1 wherein said temperature sensing probe is an elongated tubular probe.

3. The device of claim 2 wherein said probe include a hook.

4. The device of claim 1 wherein said temperature sensitive spring is bi-metallic.

5. The device of claim 1 wherein said actuator is further defined as a rotating disk in operative communication with said pointer, said pointer having an actuation pin at one end, and a lever rotatably connected to said disk such that said disk can be manually preset to a desired temperature.

6. The device of claim 1 including a transparent cover securable to said cup shaped housing.

7. An audible temperature measuring device for food, comprising;

a base having a top surface and a bottom surface, said top surface defining a cup shaped housing, said bottom surface having a temperature sensitive probe formed integral thereto and extending outwardly therefrom;

a temperature sensitive spring disposed in said temperature sensitive probe, said temperature sensitive spring coupled to an alarm mechanism operable to sound an audible alarm;

an adjustable temperature actuator coupled to said alarm mechanism, wherein said actuator includes a rotating disk in operative communication with a pointer, said pointer having an actuation pin at one end, and a lever rotatably connected to said disk such that said disk can be manually preset to a desired temperature such that said pointer is manually positionable over a temperature indicia plate, said actuator adjusted by a lever extending outward from said base; and a manual test structure for triggering said audible alarm to ensure operation, said manual test structure including a test lever;

wherein said test lever is defined by a keep with a first and second end, said first end of said keep engaging a keep spring, and a keep arm engaging said second end of said keep, such that manually sliding said keep arm disengages said keep spring from said keep causing said alarm mechanism to trigger.

\* \* \* \* \*